United States Patent [19]

Wilby et al.

[11] Patent Number: 5,075,696
[45] Date of Patent: Dec. 24, 1991

[54] DIRECTION FINDING APPARATUS

[75] Inventors: William A. Wilby, Welwyn Garden City; Anthony R. H. Brett, Kensworth, both of United Kingdom

[73] Assignee: The Marconi Company Limited, England

[21] Appl. No.: 408,666

[22] Filed: Sep. 18, 1989

[30] Foreign Application Priority Data

Oct. 28, 1988 [GB] United Kingdom ............... 8825246

[51] Int. Cl.$^5$ .............................................. G01S 5/04
[52] U.S. Cl. .................................... 342/432; 342/434; 342/444
[58] Field of Search ........................... 342/432–434, 342/437, 417, 444, 445

[56] References Cited

U.S. PATENT DOCUMENTS 3,810,082  5/1974  Arens ............................... 340/6 R
4,313,117  1/1982  Lipsky ............................. 342/437

FOREIGN PATENT DOCUMENTS 3825661  12/1989  Fed. Rep. of Germany .
0149450  11/1979  Japan ................................. 342/445
59-92369   5/1984  Japan .
 635701   4/1950  United Kingdom .
1051147  12/1966  United Kingdom .

Primary Examiner—Gregory C. Issing
Attorney, Agent, or Firm—Kirschstein, Ottinger, Israel & Schiffmiller

[57] ABSTRACT

Direction finding apparatus comprising at least ten antenna channels for connection to respective antennae in use, at least five receiver channels each coupled to at least two different antenna channels constituting a group, and circuitry for receiving and comparing the outputs of the receiver channels to determine the angular location of the signal source; the arrangement being such that in use the antennae of each group of antenna channels have a sufficient angular separation such that only one is capable of detecting the signal source at one time, and the nearest neighboring antennae of each group are coupled to respective different receiver channels different from the receiver channel of that group.

9 Claims, 2 Drawing Sheets

DIRECTION FINDING APPARATUS

BACKGROUND OF THE INVENTION

1. Field of the Invention

This invention relates to direction finding (DF) apparatus for use with directional antennas pointing at a multiplicity of different angles. Such DF apparatus typically detects a localized source of radio-frequency radiation using antennas and receivers suited to the particular waveband of interest, and the antenna boresights are typically coplanar, but the invention is applicable to other DF systems.

2. Description of Related Art

Known DF apparatus comprises several antennas, with coplanar boresight axes coinciding at a point, the antennas spaced equi-angularly to obtain 360° cover in one plane. The angular separation is typically equal to the 3 dB beamwidth of each antenna, i.e. the angle bounding a sector within which the power received by the antenna is within 3 dB of its maximum.

Such conventional apparatus locates a radiation source by first determining the angular sector in which the received signal is strongest, and then comparing the received powers from the two whose boresights bound that angular sector, in order to determine the angular position of the source within that sector. The expected variation of this power ratio with source angle is a known quantity, and it is usually possible to locate a source to an accuracy of one tenth of an angular beamwidth or sector width.

It is not normally possible to increase the angular separation of the antennas much beyond the beamwidth because this increases the dynamic range requirements of the receiver and requires exceptional control of the antenna pattern. It follows that in order to achieve a better DF accuracy over a given field of view more receiver channels would have to be used and the cost of the overall receiver would increase rapidly.

SUMMARY OF THE INVENTION

The invention provides direction finding apparatus comprising at least ten antenna channels for connection to respective antennas in use, at least five receiver channels each coupled fixedly to at least two different antenna channels constituting a group, and means for receiving and comparing the outputs of the receiver channels to determine the angular location of the signal source; the arrangement being such that in use the antennas of each group of antenna channels have a sufficient angular separation such that at most one is capable of receiving significant signal power from a point source at one time, and the nearest neighboring antennas to each antenna of each group are coupled to respective different receiver channels different from the receiver channel of that group.

BRIEF DESCRIPTION OF THE DRAWINGS

One way in which the invention may be performed will now be described, by way of example only, with reference to the accompanying schematic drawings, in which.

DETAILED DESCRIPTION OF THE PREFERRED EMBODIMENTS

Figure 1:
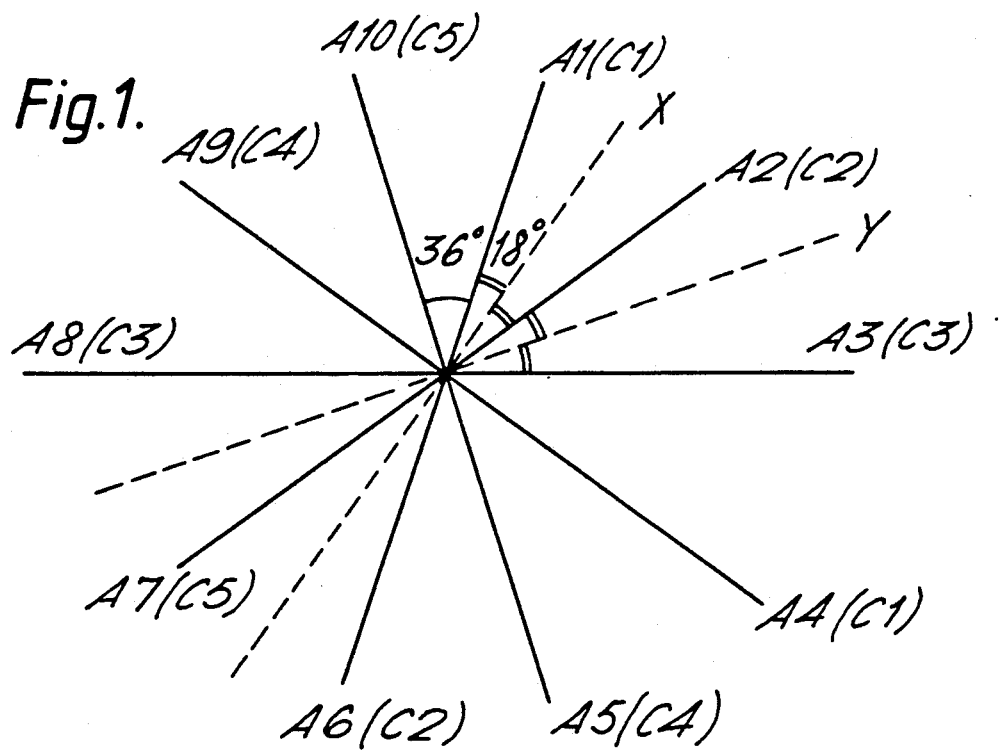
FIG. 1 is a representation of the angular deposition in a horizontal plane of a ten-antenna DF system embodying the invention.

The simplest system embodying the invention is illustrated in FIG. 1, and comprises ten similar antennas spaced equi-angularly in a horizontal plane, with their boresight axes A1 to A10 intersecting at a point. The antennas are directional and point radially outwardly, in order to scan the full 360° range in that plane. The antennas are coupled to ten respective antenna channels A1 to A10, whose outputs are combined into pairs to form five receiver channels C1 to C5, coupled to five respective receivers. The coupling between the antenna channels and the receiver channels is in accordance with two general rules, described below, which together ensure that the angular discriminating ability of the system is optimized. The outputs from the receivers are then treated in much the same way as are the antenna channel outputs in the conventional DF apparatus described above. Thus the powers of all channels are compared to identify the angular sector in which the signal received is strongest, and the powers of the two strongest channels are compared to determine the angular position of the source within that sector.

The general rules for the grounding of the antenna channels for coupling to the respective receiver channels are as follows:

First, the antennas of each pair or group must have an angular separation sufficient to prevent interference, such that a signal received in one antenna must not be received simultaneously in the other or others. The threshold of reception may be defined conveniently as, say 20 dB or 30 dB below the peak reception power. Where the antennas are separated by an angle equal to the 3 dB beamwidth, it is preferable to arrange that the antennas of each pair or group are separated mutually by at least three beamwidths, i.e. there are always at least two intermediate antennas of other pairs or groups.

Secondly, the nearest neighboring antennas to each antenna of the antenna pair or group must be coupled to a distinct receiver channel, different from the receiver channel of the pair or group in question.

Table 1 below indicates the coupling between the antennas A1 to A10 of FIGS. 1 and 2 and the five receiver channels C1 to C5, in accordance with the labelling C1 to C5 on FIG. 1.

TABLE 1

| Channel (C) | Antenna (A) | | | | | | | | | |
|---|---|---|---|---|---|---|---|---|---|---|
| | 1 | 2 | 3 | 4 | 5 | 6 | 7 | 8 | 9 | 10 |
| 1 | X | | | X | | | | | | |
| 2 | | X | | | | X | | | | |
| 3 | | | X | | | | | X | | |
| 4 | | | | | X | | | | X | |
| 5 | | | | | | | X | | | X |

Figure 2:
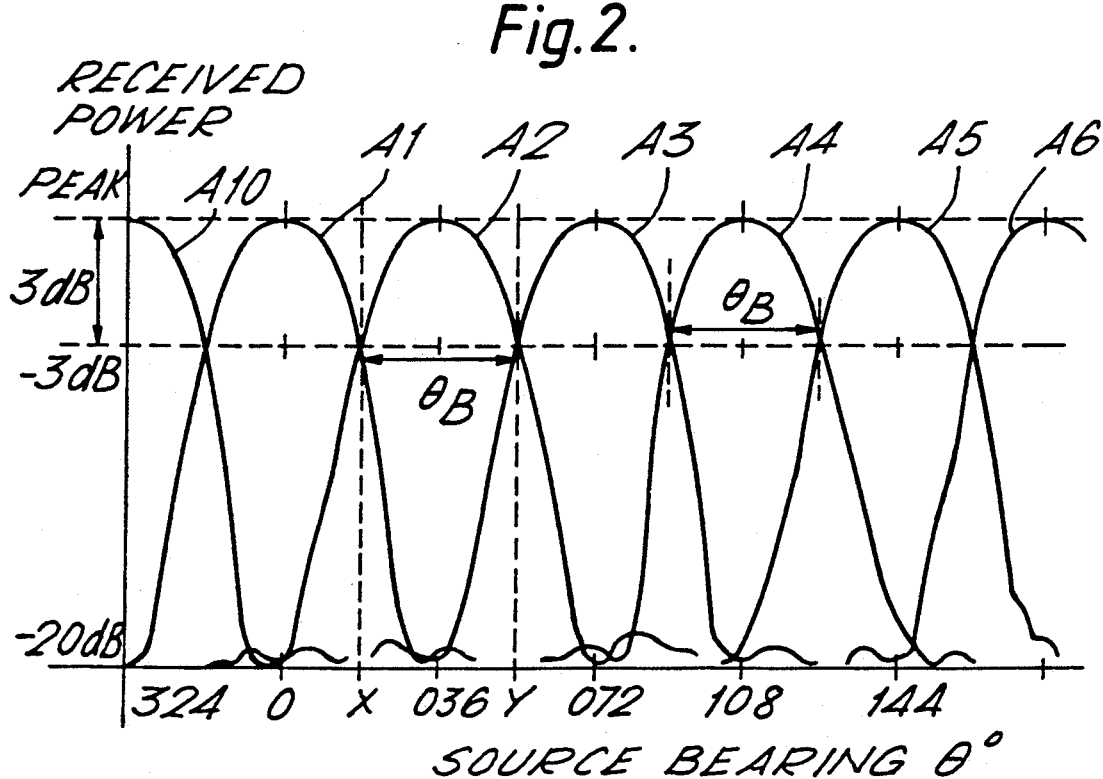
FIG. 2 is a graph of the power received from a point source in several of the antennae of FIG. 1, as a function of the angular position $\theta$ of the source.

With reference to FIG. 2, it is apparent that the second rule is satisfied in the case of channel C1 between the nearest neighboring antennas to antennas A1 and A4, i.e. A10 and A2, A3 and A5, are all coupled to different channels, i.e. to C5, C2, C3 and C4 respectively.

With reference to FIGS. 1 and 2, the 3 dB beamwidth $\theta_B$ coincides with the angular separation of the antennas, and is equal to 36°. A source detected at the angle X, bisecting the axes A1 and A2, is on the 3 dB threshold of both antennas A1 and A2, and will be received with equal power in channels C1 and C2, to which a negligible contribution is made by antennas A4 and A6 respectively, the other members of the pairs. The logarithm of the power ratio of the received signals on channels C1 and C2 will be zero, corresponding correctly to the centre of the angular range of FIG. 3, assuming $P_A$ and $P_B$ to be the signal powers in channels C1 and C2, and A and B to be the antenna axes A1 and A2. If the source had been between X and A1, still within the sector A1-A2, then by reference to FIG. 3 the result would be a positive logarithm indicating the appropriate angular location within that sector. The crude location of the source is determined as being within the sector A1-A2, and not any of the larger sectors A1-A6, A2-A4 and A4-A6, all involving combinations of the antennas channels C1 and C2, because channels C1 and C2 have higher received powers than any of channels C3, C4, C5. Thus, as described in greater detail below, the means for comparing and processing the outputs from the receiver channels C1 to C5 is programmed with the information corresponding to Table 1 necessary for it to identify the unique sector in which the source is located.

Figure 4:
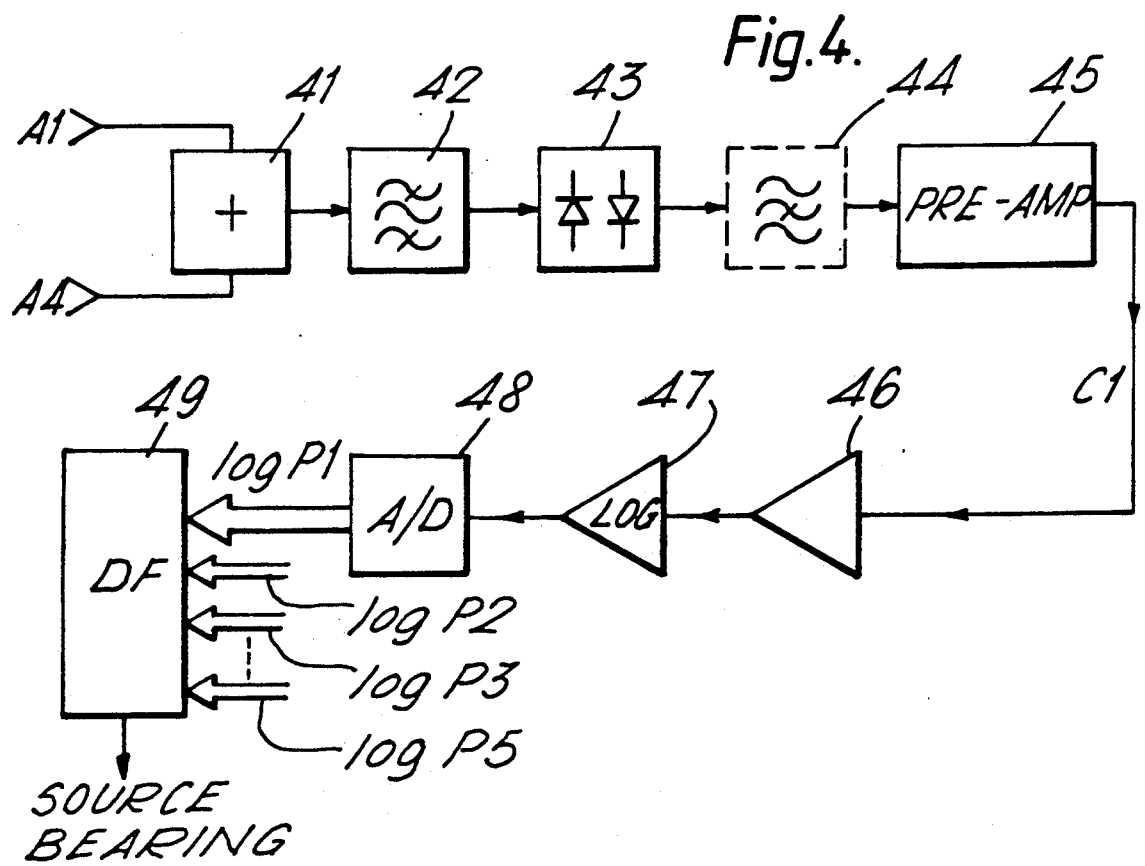
FIG. 4 is a block diagram of one pair of antenna channels and one receiver channel of the system of FIGS. 1 and 2.

Antennas A1 and A4 are shown in FIG. 4 coupled to receiver channel C1, which in turn provides a digital output log P1 representative of the logarithm of the received power to the DF comparing and processing means 49, which receives corresponding outputs log P2 to log P5 from the other four receiver channels, and determines the source bearing. The outputs from the antenna channels A1 and A4 are combined at 41 and the combined signal is typically fed through a band pass filter 42, a limiter 43, a YIG filter 44, pre-amplifier or down-converter 45 (with an architecture to suit crystal video receiver or superheterodyne applications), a further amplifier 46 and high dynamic range log amplifier 47, and an analogue-to-digital converter 48.

Figure 3:
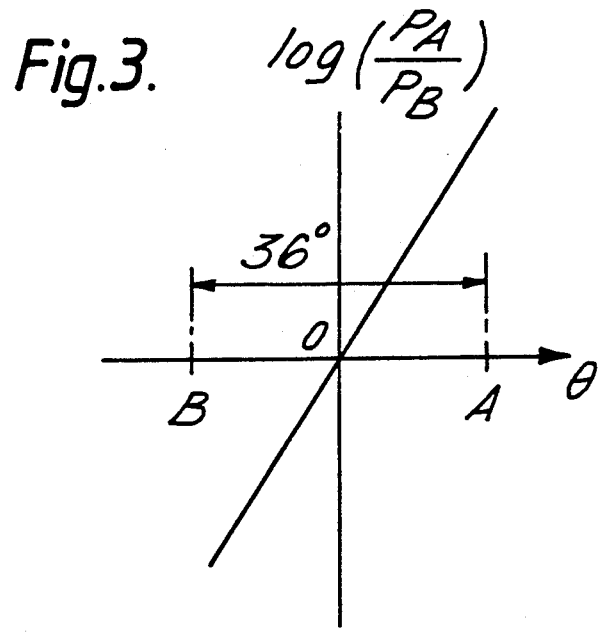
FIG. 3 is a graph of the variation with source angle $\theta$ of the logarithm of the power ratio between two adjacent antennas A and B both receiving radiation from the same source.

The DF comparing and processing means 49 determines the highest (log $P_A$) and second highest (log $P_B$) of the receiver channel outputs, and then computes the source bearing according to the formula:

(Sector angle)+SIGN. K. (log $P_A$−log $P_B$)

where K is the tracking slope of approximately 1.5 degrees per decibel, i.e. the slope of the graph of FIG. 3, and the quantities (Sector Angle) and SIGN are read out from the following table, which assumes that the relationship of FIG. 3 is general to all adjacent antennas:

TABLE 2

| Receiver Channel Providing $P_A$ | Receiver Channel Providing $P_B$ | Sector Angle | SIGN |
|---|---|---|---|
| C1 | C3 | 90 | +1 |
| C1 | C5 | 342 | +1 |
| C2 | C1 | 18 | +1 |
| C2 | C4 | 162 | +1 |
| C3 | C2 | 54 | +1 |
| C3 | C5 | 234 | +1 |
| C4 | C1 | 126 | +1 |
| C4 | C3 | 270 | +1 |
| C5 | C4 | 306 | +1 |
| C5 | C2 | 198 | +1 |
| C1 | C2 | 18 | −1 |
| C1 | C4 | 126 | −1 |
| C2 | C3 | 54 | −1 |
| C2 | C5 | 198 | −1 |
| C3 | C1 | 90 | −1 |
| C3 | C4 | 270 | −1 |
| C4 | C2 | 162 | −1 |
| C4 | C5 | 306 | −1 |
| C5 | C1 | 342 | −1 |
| C5 | C3 | 234 | −1 |

Thus, in the case where channels C1 and C2 are the highest and second highest respectively in power, the source bearing is computed as:

(18°)+(−1). (1.5). (log $P_A$−log $P_B$), which is between X (at 018°) and A1 (at 0°).

Bearings are taken relative to the boresight A1.

The DF accuracy of this ten antenna, five receiver channel system is as good as a conventional system with ten receiver channels. The apparatus could comprise a larger number of antennas, with a number of receiver channels equal to a rational fraction of that number: using the invention, the DF accuracy of an n antenna system can be achieved with n/2, or n/3, etc. receiver channels, provided only that the two general rules above are satisfied. Table 3 below is one example of a twelve antenna system where the antenna channels are paired, and Table 4 below is one example of a twenty-one antenna system in which the antenna channels are in groups of three, coupled to seven receiver channels. Three-way combining is only possible with twenty-one, or a larger multiple of three, antenna channels.

TABLE 3

| Channel (C) | Antenna (A) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | X | | | | | X | | | | | | |
| 2 | | X | | | | | | X | | | | |
| 3 | | | X | | | | | | | X | | |
| 4 | | | | X | | | | | | | | X |
| 5 | | | | | X | | | X | | | | |
| 6 | | | | | | X | | | | | X | |

TABLE 4

| Channel (C) | Antenna (A) | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | X | | | | X | | | X | | | | | | | | | | | | | |
| 2 | | | | | | | | | | | | X | | | | X | | | | | X |
| 3 | | X | | X | | | | | | | | | X | | | | | | | | |
| 4 | | | | | | | X | X | | | | | | X | | | | | | | |
| 5 | | | | | | | | | X | | | | | | X | | X | | | | |
| 6 | | X | | | | | | | | | X | | | | | | | X | | X | |
| 7 | | X | | | | | | | | | | | X | | | | | | X | | |

Although the invention has been illustrated by apparatus with coplanar antennas in a horizontal plane, extending the full 360° of azimuth, clearly the invention is applicable to other systems; for example, there may be banks of such antennas whose outputs are combined to provide triangulation to locate absolutely the source, and the antennas may be capable of scanning. The apparatus may also be capable of transmitting signals, for example monopulse radar and sonar signals, to locate targets which reflect but are not radiation sources.

We claim:

1. Direction finding apparatus for locating a signal source, comprising: at least ten antenna channels for connection to respective antennas in use, at least five receiver channels having signal outputs, each receiver channel being coupled to at least two different antenna channels constituting a group to provide every pair of adjacent antennas with a different combination of receiver channels, and means for receiving and comparing the signal outputs of all the receiver channels to identify the two highest signal outputs and to determine therefrom the angular location of the signal source, the antennas of each group of antenna channels being sufficiently angularly separated that, at most, one of the antennas of each group is capable of receiving significant signal power from the signal source at one time.

2. Apparatus according to claim 1, further comprising at least ten said antennas coupled to respective said antenna channels.

3. Apparatus according to claim 2, in which the minimum angular separation of the antennas coupled to any one of said receiver channels is three 3 dB beamwidths of the antennas.

4. Apparatus according to claim 2, in which the antenna boresight axes are coplanar.

5. Apparatus according to claim 4, in which the antenna boresight axes coincide at a point.

6. Apparatus according to claim 5, in which the antenna boresight axes are disposed equi-angularly about a central point.

7. Apparatus according to claim 2, in which ten antennas are coupled to five receiver channels and are sequentially and equi-angularly arranged relative to one another; and wherein a first and a fourth antenna are coupled to a first receiver channel; and wherein a second and a sixth antenna are coupled to a second receiver channel; and wherein a third and an eighth antenna are coupled to a third receiver channel; and wherein a fifth and a ninth antenna are coupled to a fourth receiver channel; and wherein a seventh and a tenth antenna are coupled to a fifth receiver channel.

8. Apparatus according to claim 2, in which twelve antennas are coupled to six receiver channels and are sequentially and equi-angularly arranged relative to one another; and wherein a first and a sixth antenna are coupled to a first receiver channel; and wherein a second and an eighth antenna are coupled to a second receiver channel; and wherein a third and a tenth antenna are coupled to a third receiver channel; and wherein a fourth and a twelfth antenna are coupled to a fourth receiver channel; and wherein a fifth and a ninth antenna are coupled to a fifth receiver channel; and wherein a seventh and an eleventh antenna are coupled to a sixth receiver channel.

9. Apparatus according to claim 2, in which twenty-one antennas are coupled to seven receiver channels and are sequentially and equi-angularly arranged relative to one another; and wherein a first, fifth and eighth antenna are coupled to a first receiver channel; and wherein a twelfth, seventeenth and twenty-first antenna are coupled to a second receiver channel; and wherein a third, sixth and thirteenth antenna are coupled to a third receiver channel; and wherein a seventh, tenth and sixteenth antenna are coupled to a fourth receiver channel; and wherein a ninth, fourteenth and eighteenth antenna are coupled to a fifth receiver channel; and wherein a fourth, fifteenth and twentieth antenna are coupled to a sixth receiver channel; and wherein a second, eleventh and nineteenth antenna are coupled to a seventh receiver channel.

* * * * *